(12) United States Patent
Wei et al.

(10) Patent No.: US 10,712,588 B2
(45) Date of Patent: Jul. 14, 2020

(54) CONTACT LENS HAVING A SPACE

(71) Applicant: Paragon CRT Company LLC, Gilbert, AZ (US)

(72) Inventors: Jianping Wei, Gilbert, AZ (US); Kirk Reed, Gilbert, AZ (US); Joseph Sicari, Gilbert, AZ (US)

(73) Assignee: Paragon CRT Company LLC, Gilbert, AZ (US)

(*) Notice: Subject to any disclaimer, the term of this patent is extended or adjusted under 35 U.S.C. 154(b) by 92 days.

(21) Appl. No.: 15/954,330

(22) Filed: Apr. 16, 2018

(65) Prior Publication Data

US 2018/0299699 A1 Oct. 18, 2018

Related U.S. Application Data

(63) Continuation-in-part of application No. 15/262,319, filed on Sep. 12, 2016, now Pat. No. 10,049,275, which is a continuation-in-part of application No. 14/502,346, filed on Sep. 30, 2014, now Pat. No. 9,442,307, which is a continuation of application No. 13/980,023, filed as application No.
(Continued)

(51) Int. Cl.
*G02C 7/04* (2006.01)
*B29D 11/00* (2006.01)

(52) U.S. Cl.
CPC ........ *G02C 7/049* (2013.01); *B29D 11/00076* (2013.01); *B29D 11/00048* (2013.01); *B29D 11/00807* (2013.01); *G02C 2202/16* (2013.01)

(58) Field of Classification Search
CPC .................................. G02C 7/049; G02C 7/04
USPC .......................... 351/159.02, 159.04, 159.33
See application file for complete search history.

(56) References Cited

U.S. PATENT DOCUMENTS

| 1,929,228 A | 10/1933 | Nilhelm |
| 2,641,161 A | 6/1953 | Silverstein |

(Continued)

FOREIGN PATENT DOCUMENTS

| CA | 2280022 | 12/2001 |
| CN | 203164540 U | 8/2013 |

(Continued)

OTHER PUBLICATIONS

International Search Report and Written Opinion for International Application No. PCT/US2013/032314 dated Jun. 17, 2013.
(Continued)

*Primary Examiner* — Darryl J Collins
(74) *Attorney, Agent, or Firm* — Law Offices of Damon L. Boyd, PLLC

(57) ABSTRACT

The present disclosure relates generally to contact lenses having a space within the lens. In various embodiments, a contact lens comprises a posterior component having an anterior surface and an anterior component having a posterior surface. The posterior component and the anterior component can comprise various combinations of gas permeable and gas impermeable optical materials. A contact lens also comprises a space between the posterior surface and the anterior surface, with the space configured to permit diffusion of a gas from a perimeter of the space through the space and across the anterior surface of the posterior component.

25 Claims, 7 Drawing Sheets

Related U.S. Application Data

PCT/US2013/032314 on Mar. 15, 2013, now Pat. No. 8,911,078.

(60) Provisional application No. 62/486,327, filed on Apr. 17, 2017, provisional application No. 61/651,722, filed on May 25, 2012.

(56) References Cited

U.S. PATENT DOCUMENTS

| | | | |
|---|---|---|---|
| 3,246,941 | A | 4/1966 | Moss |
| 3,488,111 | A | 1/1970 | Isen |
| 3,710,795 | A | 1/1973 | Higuchi |
| 3,973,838 | A | 8/1976 | Page |
| 4,099,859 | A | 7/1978 | Merrill |
| 4,174,156 | A * | 11/1979 | Glorieux .............. G02B 3/14 351/159.41 |
| 4,401,371 | A | 8/1983 | Neefe |
| 4,477,158 | A | 10/1984 | Pollock |
| 4,621,912 | A | 11/1986 | Meyer |
| 4,681,412 | A | 7/1987 | Lemelson |
| 4,709,996 | A * | 12/1987 | Michelson .......... A61F 2/1616 351/159.04 |
| 4,720,286 | A | 1/1988 | Bailey |
| 4,731,078 | A | 3/1988 | Stoy |
| 5,010,141 | A | 4/1991 | Mueller |
| 5,104,213 | A | 4/1992 | Wolfson |
| 5,120,121 | A | 6/1992 | Rawlings |
| 5,166,710 | A | 11/1992 | Hofer |
| 5,270,051 | A | 12/1993 | Harris |
| 5,671,038 | A | 9/1997 | Porat |
| 5,712,721 | A | 1/1998 | Large |
| 5,760,100 | A | 6/1998 | Nicolson |
| 6,005,536 | A | 12/1999 | Beadles |
| 6,048,063 | A | 4/2000 | Fritsch |
| 6,142,016 | A | 11/2000 | Kobayashi et al. |
| 6,726,322 | B2 | 4/2004 | Andino |
| 6,779,888 | B2 | 8/2004 | Marmo |
| 6,851,805 | B2 | 2/2005 | Blum |
| 7,559,650 | B2 | 7/2009 | Iuliano |
| 7,637,947 | B2 | 12/2009 | Smith |
| 7,695,135 | B1 | 4/2010 | Rosenthal |
| 8,087,777 | B2 | 1/2012 | Rosenthal |
| 8,096,655 | B2 | 1/2012 | Daphna |
| 8,441,731 | B2 | 5/2013 | Sprague |
| 8,482,858 | B2 | 7/2013 | Sprague |
| 8,515,728 | B2 | 8/2013 | Boyd |
| 8,520,309 | B2 | 8/2013 | Sprague |
| 8,911,078 | B2 | 12/2014 | Meyers |
| 8,965,460 | B1 | 2/2015 | Rao |
| 9,039,171 | B2 | 5/2015 | Groisman |
| 9,442,307 | B2 | 9/2016 | Meyers |
| 10,049,275 | B2 | 8/2018 | Sicari et al. |
| 2002/0138249 | A1 | 9/2002 | Kanevsky |
| 2004/0212779 | A1 | 10/2004 | Dahi |
| 2006/0290882 | A1 | 12/2006 | Meyers |
| 2007/0154522 | A1 | 7/2007 | Chow |
| 2010/0149618 | A1 | 6/2010 | Sprague |
| 2010/0161050 | A1 | 6/2010 | Detmers |
| 2010/0208357 | A1 * | 8/2010 | Batchko ................ G02B 3/14 359/666 |
| 2010/0265163 | A1 | 10/2010 | Legerton |
| 2011/0096100 | A1 | 4/2011 | Sprague |
| 2011/0157891 | A1 | 6/2011 | Davis |
| 2011/0228213 | A1 | 9/2011 | Legerton |
| 2012/0120365 | A1 | 5/2012 | Legerton |
| 2012/0147320 | A1 | 6/2012 | Legerton |
| 2012/0206691 | A1 | 8/2012 | Iwai |
| 2013/0308092 | A1 | 11/2013 | Groisman |
| 2014/0232982 | A1 * | 8/2014 | Iwai ...................... G02C 7/085 351/159.03 |
| 2015/0120276 | A1 | 4/2015 | Wu |
| 2016/0091737 | A1 | 3/2016 | Kim |

FOREIGN PATENT DOCUMENTS

| | | |
|---|---|---|
| DE | 861753 | 7/1949 |
| EP | 0032517 | 1/1980 |
| EP | 1159941 | 12/2001 |
| EP | 1832913 A1 | 12/2009 |
| FR | 1279252 | 11/1961 |
| FR | 2656933 | 7/1991 |
| WO | 9110154 | 7/1991 |
| WO | 3307840 | 4/1993 |
| WO | 2004015460 | 2/2004 |

OTHER PUBLICATIONS

Non-Final Office Action for U.S. Appl. No. 13/980,023 dated Aug. 8, 2014.
Notice of Allowance for U.S. Appl. No. 13/980,023 dated Sep. 16, 2014.
Non-Final Office Action for U.S. Appl. No. 14/502,346 dated Feb. 19, 2016.
Reply to Feb. 19, 2016 Non-Final Office Action for U.S. Appl. No. 14/502,346 dated Apr. 21, 2016.
Notice of Allowance for U.S. Appl. No. 14/502,346 dated May 18, 2016.
Examination Report for EP App No. 13794262.9 dated Dec. 12, 2015.
Extended European Search Report for EP application No. 13794262.9 dated Apr. 17, 2015.
Response to Dec. 12, 2015, Examination Report for EP App. No. 13794262.9 dated May 5, 2016.
Non Final Office Action for U.S. Appl. No. 15/262,319 dated Oct. 18, 2017.
Reply to Oct. 18, 2017 Non Final Office Action for U.S. Appl. No. 15/262,319 dated Feb. 15, 2018.
Notice of Allowance for U.S. Appl. No. 15/262,319 dated Apr. 24, 2018.
Amendment under 37 CFR 1.312 for U.S. Appl. No. 15/262,319 dated May 22, 2018.
Amendment Approval for U.S. Appl. No. 15/262,319 dated Jun. 1, 2018.
U.S. Appl. No. 15/262,319 Replacement Drawing Transmittal and Drawing dated Jun. 21, 2018.

* cited by examiner

CONTACT LENS HAVING A SPACE

CROSS-REFERENCE TO RELATED APPLICATIONS

This application claims priority from U.S. Provisional Patent Application Ser. No. 62/486,327 filed on Apr. 17, 2017 and is a continuation-in-part of U.S. application Ser. No. 15/262,319, filed Sep. 12, 2016, which is a continuation-in-part of U.S. application Ser. No. 14/502,346, filed Sep. 30, 2014, now U.S. Pat. No. 9,442,307, which is a continuation of U.S. patent application Ser. No. 13/980,023 filed Jul. 16, 2013, now U.S. Pat. No. 8,911,078 which is a U.S. national phase filing under 35 U.S.C. § 371 of PCT/US/2013/032314 filed Mar. 15, 2013, which claims priority from U.S. Provisional Patent Application Ser. No. 61/651,722 filed on May 25, 2012, all of which are incorporated herein by reference in their entirety.

BACKGROUND

Field

The present disclosure relates generally to contact lenses having a space therein.

Discussion of the Related Art

The development of various miniaturized optical components and the ability to manufacture increasingly sophisticated optical features has driven a growing interest in adapting an expanding array of optical features and other types of technological products to contact lenses worn on the surface of an eye. Adaptation of various optical features and other technologies to a wearable lens can produce improved contact lenses, but often require thicker lenses that may not provide adequate oxygen supply to corneal tissue based on the gas exchange capacity of conventional gas permeable optical materials and lens designs. Likewise, a variety of optical components may not comprise or be compatible with optical materials having the necessary properties of gas permeability to ensure adequate oxygen transmission to the cornea when placed on an eye.

Thus, there is a need in the art for contact lenses that can incorporate various optical components or features of interest while adequately providing for oxygenation of the corneal cells.

SUMMARY

In general, the present disclosure provides contact lenses having a space therein and related methods for their manufacture. For example, in various embodiments, a contact lens is provided that includes a posterior component and an anterior component. The posterior component and the anterior component can comprise gas permeable optical materials. The posterior component can comprise an anterior surface and the anterior component can comprise a posterior surface, with the anterior surface and the posterior surface together defining a space or spaces within the contact lens between the anterior component and the posterior component. A profile of the space may vary based on the region of the lens where the space is present. The anterior and posterior components may be joined by various adhesives and mechanical mechanisms.

The configuration of the space, the gas permeable optical materials, and other features of the contact lens can facilitate gas exchange that is sufficient, for example, to permit oxygenation of the corneal tissue of an eye, which may occur by oxygen passing through select portions of the anterior and posterior components.

BRIEF DESCRIPTION OF THE DRAWINGS

The accompanying drawings are included to provide a further understanding of the disclosure and are incorporated in and constitute a part of this specification, illustrate embodiments of the disclosure, and together with the description serve to explain the principles of the disclosure, wherein.

DETAILED DESCRIPTION OF THE ILLUSTRATED EMBODIMENTS

Figure 1:
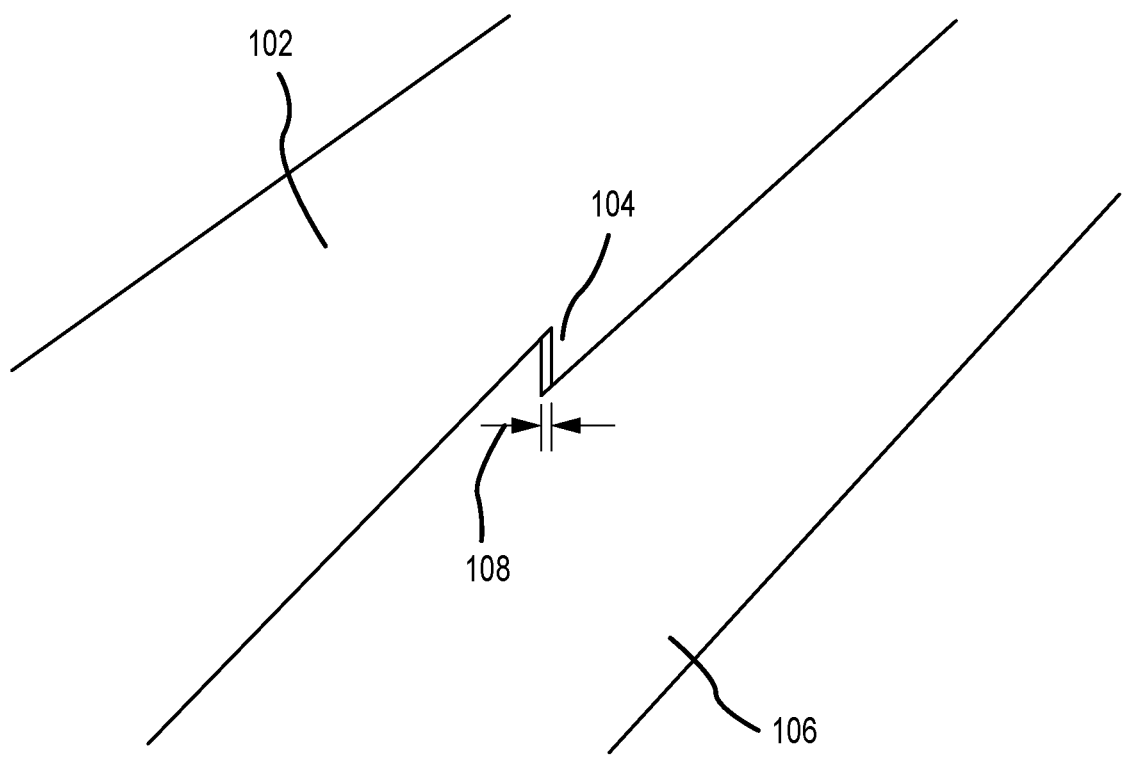
FIG. 1 is a close-up cross-sectional view of an interference fit mechanism comprised of a protrusion and a depression for adhering an anterior component and a posterior component of a contact lens to one another in accordance with the present disclosure.

Persons skilled in the art will readily appreciate that various aspects of the present disclosure can be realized by any number of methods and systems configured to perform the intended functions. Stated differently, other methods and systems can be incorporated herein to perform the intended functions. It should also be noted that the accompanying drawing figures referred to herein are not all drawn to scale, but may be exaggerated to illustrate various aspects of the present disclosure, and in that regard, the drawing figures should not be construed as limiting. Finally, although the present disclosure can be described in connection with various principles and beliefs, the present disclosure should not be bound by theory.

As used herein, "anterior surface" refers to a lens surface closer to an eyelid, and "posterior surface" refers to a lens surface closer to a cornea of the eye.

As used herein, "contact lens" can be used to refer to a lens worn on an eye having optical features or qualities, including functions such as vision correction, aesthetics, and other optical functions.

As used herein, "optical feature" refers to nay feature that may be considered valuable for incorporation in a contact lens, including features such as high powers and cylinders, bifocal designs and wavefront aberration nullification, polarization filters, refractive lenslets, diffractive lenslets, selective chromatic filters, bandpass filters, circular polarizing filters, linear polarizer filters, gray attenuator filters, birefringent filters, zone plates, mirrors, electronic circuits, electronic devices, microdisplays, telecommunication devices, sensors, antennas, nanowires, energy generation or storage devices, pharmaceutical delivery devices, cameras, etc.

As used herein, "fluid communication" refers the ability of a fluid (i.e., a liquid, gas, or semi-solid) to move or flow from one location to another location. In the context of the present disclosure, the term "fluid communication" may be used to describe a property of spaces or conduits suitable to permit a flow of a gas or liquid between two locations, such as by bulk flow or diffusion.

Referring to FIGS. 1-7, various views of contact lenses in accordance with various embodiments of the present disclosure are illustrated. In general, contact lens 100 can comprise hard, semi-hard or soft optical materials, as described in more detail below, and can be configured for vision correction, orthokeratology, aesthetics or display technology, to name just a few functions. In various embodiments, the contact lens can be a scleral, corneo-scleral, or corneal lens. Contact lens 100 can have an outer diameter of from about 5 mm to about 20 mm, with smaller or larger diameters being possible in special cases. By way of non-limiting example, a scleral contact lens can have an outer diameter of up to about 28 mm or more. Furthermore, a finished lens can be radially symmetrical, bilaterally symmetrical, or non-symmetrical, and can include bifocal, toric, or quadrant specific optical features or geometries.

In accordance with various embodiments and as described in greater detail below, contact lens 100 may comprise a multicomponent lens that can include a posterior component 102 and an anterior component 106. The lens also includes a space 110 defined by a posterior surface of the anterior component 106 and an anterior surface of the posterior component 102. Posterior component 102 and anterior component 106 can comprise various combinations of gas permeable and gas impermeable optical materials that, in combination with space 110 serve to facilitate gas exchange between an anterior surface of the contact lens 100 and a posterior central surface of the contact lens 100 that would be located adjacent to the corneal tissue when applied to an eye. In this general manner and as described in greater detail below, a lens manufactured in accordance with various embodiments can modularly incorporate any of a variety of optical features or devices in anterior component 106 while providing sufficient oxygenation to the corneal tissue of an eye to which the lens is applied. As such, a contact lens in accordance with the present disclosure may provide certain previously unrealized benefits conferred by the structure of the device as described herein that afford substantial latitude in the configuration of anterior component 106 (e.g., its thickness) as well as the materials and/or optical features (e.g., gas impermeable materials and/or features that might impede gas exchange of an optical material) used in anterior optical component 106.

For example, a contact lens 100 can be prepared by a process comprising mating separate device components and bonding the mated components to form the contact lens 100. For example, a contact lens can be prepared by a process comprising mating a gas permeable posterior component 102 to an anterior component 106, which may also be gas permeable. In various embodiments, mating can comprise mating matching surfaces in such a manner that posterior component 102 and anterior component 106 are secured to one another. In various embodiments, bonding materials and adhesives now known or as yet unknown may be used to secure posterior component 102 and anterior component 106 to one another in one or more locations on the contact lens 100, for example, proximate to an edge of the contact lens 100. In other embodiments, mating can comprise injection molding, casting, or otherwise forming (such as 3-D printing) or depositing material of one device component into another device component.

Bonding can also comprise molding, casting, welding, or otherwise joining the posterior component to the anterior component. In various embodiments comprising mating by processes such as molding or casting, mating and bonding may not comprise distinguishable process steps. For example, mating and bonding may essentially occur together upon curing of the molded material. Likewise, where bonding comprises an interference fit (example described below), bonding may occur contemporaneously with mating or insertion of one device component into the second device component.

For example, with reference to FIG. 1, a "snap together" or interference fit between features on posterior component 102 and anterior component 106 may be provided. In this regard, posterior component 102 may have a depression 104 and anterior component 106 may have a protrusion 108 that suitably corresponds to depression 104 such that an interference fit may be created between the two. When pressed together, anterior component 106 and/or protrusion 108 deform enough for protrusion 106 to enter depression 104 and then return to its initial shape such that the protrusion 104 is locked in the depression 108. The components for creating the interference fit features may extend about the entire circumference of the contact lens 100, or may be intermittently placed in location about the circumference of the contact lens 100. Such interference features may also be used in combination with other means of securing the posterior component 102 and the anterior component 106. In various embodiments, the interference fit may have a 5 μm gap and 20 to 50 μm depth in a landing zone of the contact lens 100, a 5 μm gap and 20 to 50 μm depth at an edge of the contact lens 100, or various other parameters, depending on the particular application.

In accordance with various embodiments, the posterior component 102 and anterior component 106 may comprise "wafers" comprised of the same material or different materials. For example, these wafers may be comprised of one or more of fluorosilicon acrylate, silicon acrylate, polymethylmethacrylate, a silicon hydrogel, a biocompatible material, a transparent material, or another suitable material. Examples of materials specifically contemplated herein include low to mid-range Dk materials such as Paragon Vision Sciences, Inc.'s FluoroPerm® 30 and 60 and Paragon HDS®, to high Dk materials such as Paragon Vision Sciences, Inc.'s HDS®100. In general, any combination of gas permeable, biocompatible material or other optical material now known or as yet unknown may be suitable for use.

In accordance with various embodiments, the components of contact lens 100 can be mated in any logical order. In accordance with various embodiments, contact lens 100 can be prepared by a process further comprising machining a finished lens from a contact lens blank comprised of components such as those described herein. In various embodiments, machining can comprise a process such as milling, lathing, or the like, to produce a finished contact lens that may be applied to an eye.

In accordance with various embodiments and as mentioned above, the contact lens 100 can comprise a space 110 configured to provide gas exchange for the corneal tissue of an eye. Space 110 can be filled with any medium, or number of mediums, of matter, for example a gas (e.g., air or oxygen), a liquid (e.g., water or saline), and a solid (e.g., a gel or a rigid solid).

In various embodiments, the space has a diameter sufficient to provide gas exchange from the space through the posterior wall (i.e., a portion of gas permeable posterior component 102) of the space to the corneal tissue that would underlie an eye to which contact lens 100 is applied. Likewise, the space can have one or more gaps or channels with a depth (i.e., a distance between the anterior wall and the posterior wall of the space) that is sufficient to permit molecular diffusion of a gas such as oxygen and/or bulk flow of air (or any other fluid) from a peripheral portion of the space 110 to a remote portion of the space, such as the central portion that is most distant from the periphery of the space.

Expressed differently, the configuration of the space, including, for example, the distance and uniformity of the dimensions between the anterior and the posterior walls; the diameter of the space; the three-dimensional shape of the space; the configuration of peripheral spaces that may be present and the number, size, and configuration of various channels and portals communicating between peripheral spaces and centrally located spaces; the requirement for structural support such as support members within the space (including those described below); the overall configuration of the lens including the size and shape of the lens and the optical features included therein; the composition of the oxygen permeable materials used in the gas exchange zones; and the thickness and surface area of the device in the gas exchange zones; may influence, and can be designed or engineered to accomplish, the optical performance objectives of the contact lens 100 while providing for sufficient gas exchange of the corneal tissue to ensure corneal tissue health during wear.

In various embodiments, the space 110 can comprise one or more peripheral gaps located near the perimeter or peripheral circumference of the space. A peripheral gap can be defined by anterior component 106 and posterior component 102 and can be continuous with space 110. The peripheral gap can be formed or defined by a feature such as a "jog" or other change in the profile of the anterior component 106, the posterior component 102, or both. In various embodiments, the peripheral gap can have a depth that is greater than the depth of other areas of the space 110, for example, that of the depth located in a central region of contact lens 110.

Figure 2:
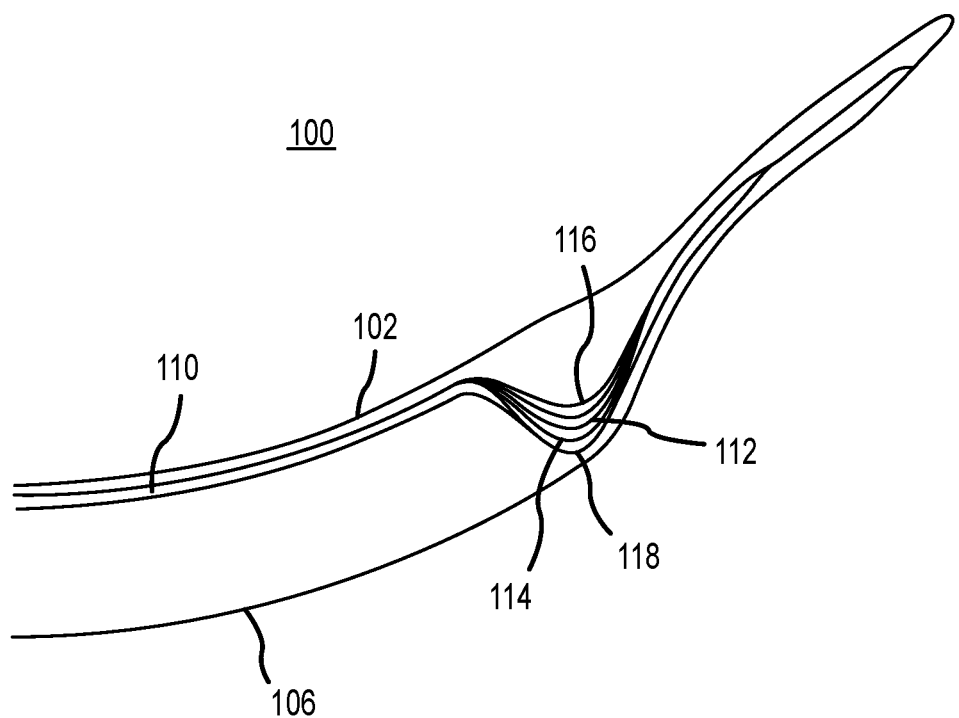
FIG. 2 is a cross-sectional view of components of a contact lens having a space and peripheral gap in accordance with the present disclosure.
Figure 3:
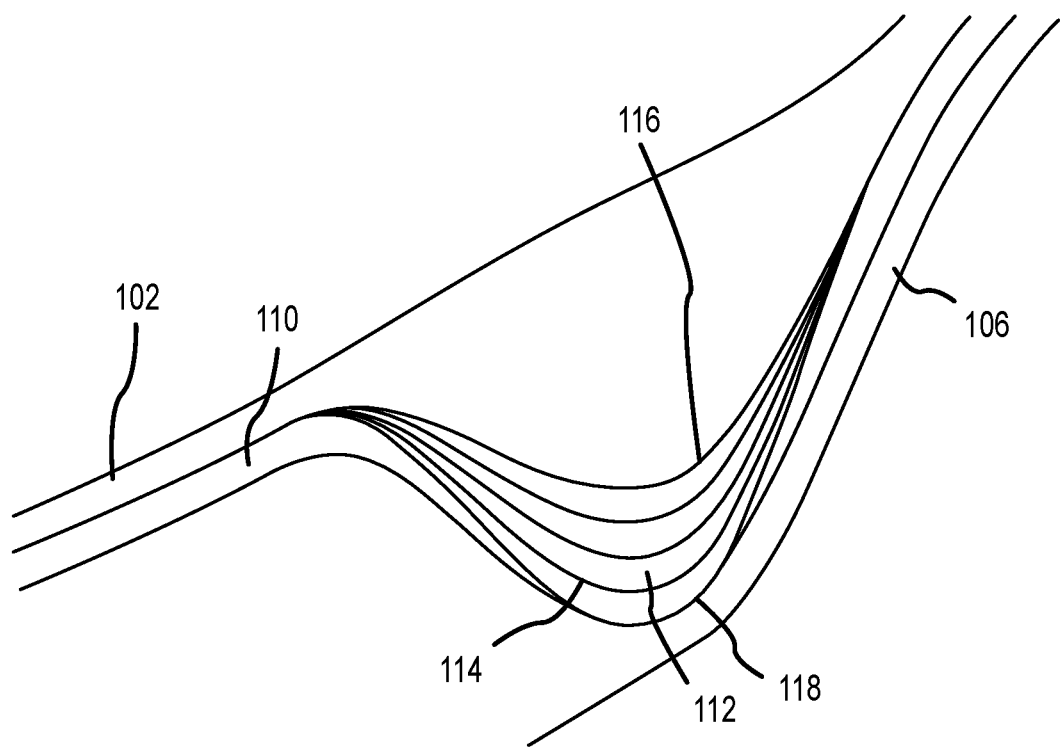
FIG. 3 is a close-up cross-sectional view of a peripheral gap in the contact lens illustrated in FIG. 2 in accordance with the present disclosure.
Figure 4:
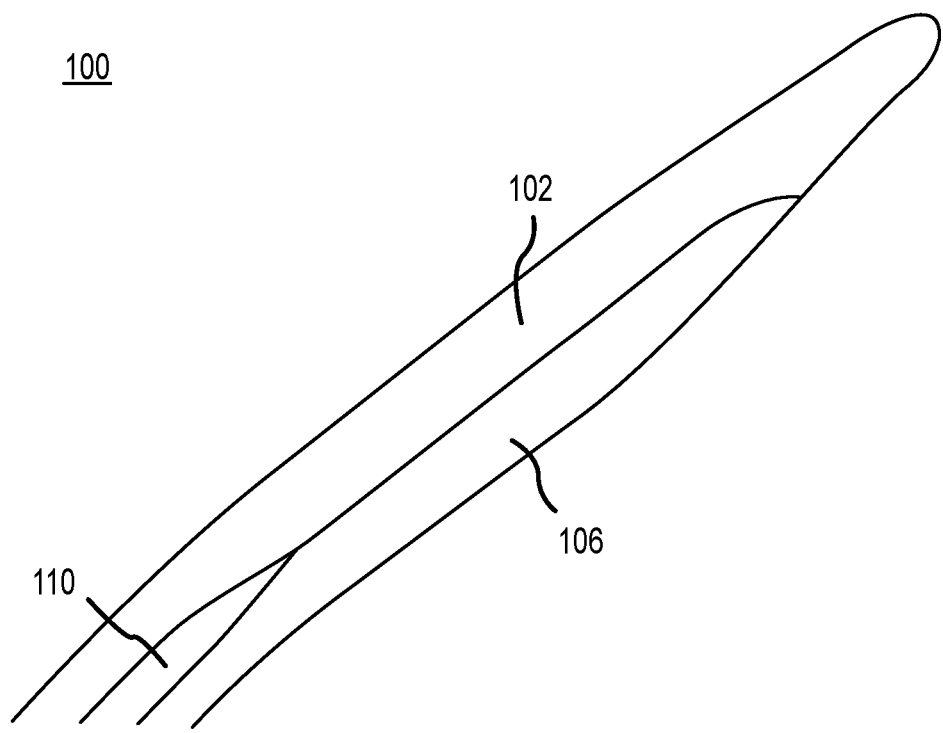
FIG. 4 is a close-up cross-sectional view of an edge of the contact lens illustrated in FIG. 2 in accordance with the present disclosure.

For example, with reference to FIGS. 2-4, the space 110 may comprise an air gap 112 with a depth of about 0.10 mm to about 0.40 mm, which may correlate to the center thickness of anterior component 106. With a 0.10 mm gap depth, the center thickness of the lens can be reduced significantly to 0.50 mm or even 0.40 mm for other applications, such as when applying photochromic or polarized films (which are generally not oxygen permeable).

In some embodiments, the gap 112 may only open to the central area in one quadrant, for example in $sine^2$. Alternatively, the gap 112 may open to the central area in all four quadrants of the contact lens 100. In various embodiments, the depth may vary as a function of $sine^2$ around the circumference of contact lens 100. For example, with specific reference to FIGS. 2 and 3, the depth of the gap 112 may vary from about 0.10 mm (114) to about 0.40 mm (116) in incremental steps (e.g., 0.10 mm steps). The gap 112 may close at 0°, 90°, 180° and 270° (118), while remaining open to the central area in between those points, and varying as a function of $sine^2$ around the circumference of contact lens 100.

Figure 5:
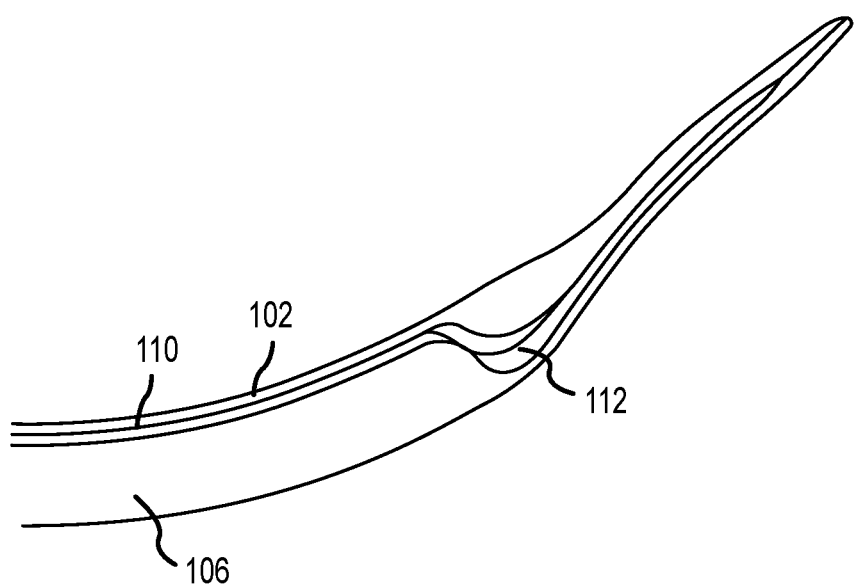
FIG. 5 is a cross-sectional view of an alternative embodiment of components of a contact lens having a space and peripheral gap in accordance with the present disclosure.
Figure 6:
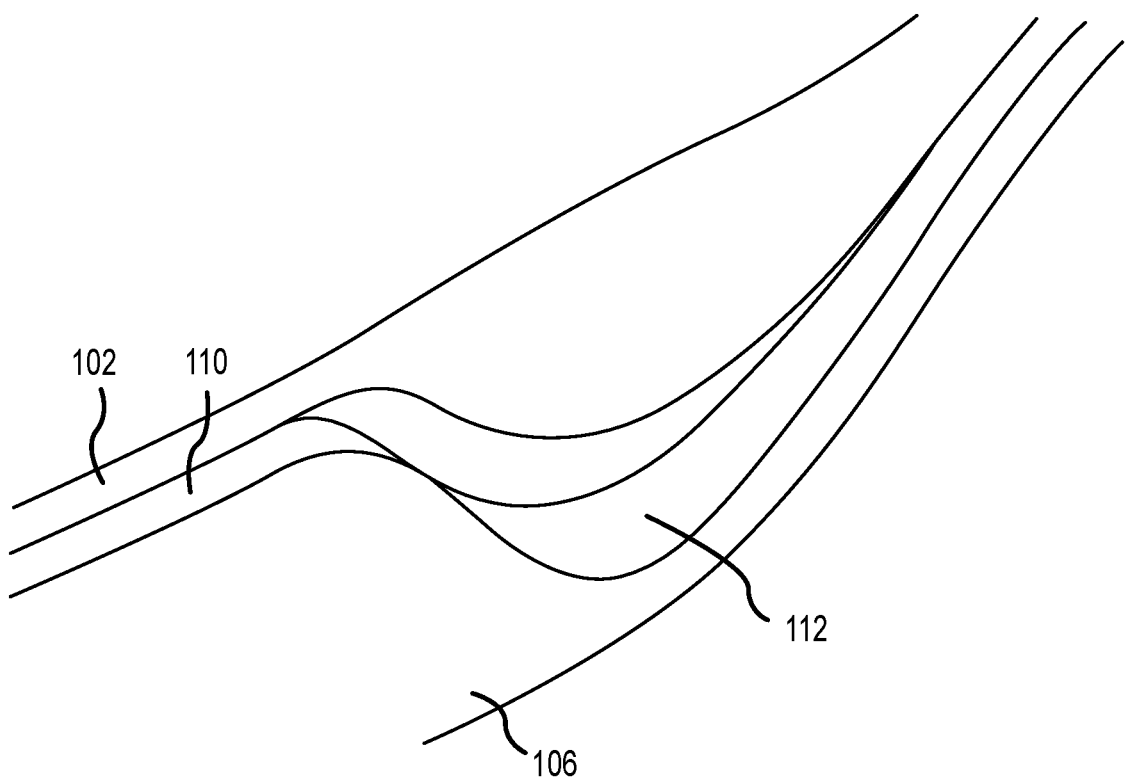
FIG. 6 is a close-up cross-sectional view of the peripheral gap of the contact lens illustrated in FIG. 5 in accordance with the present disclosure.
Figure 7:
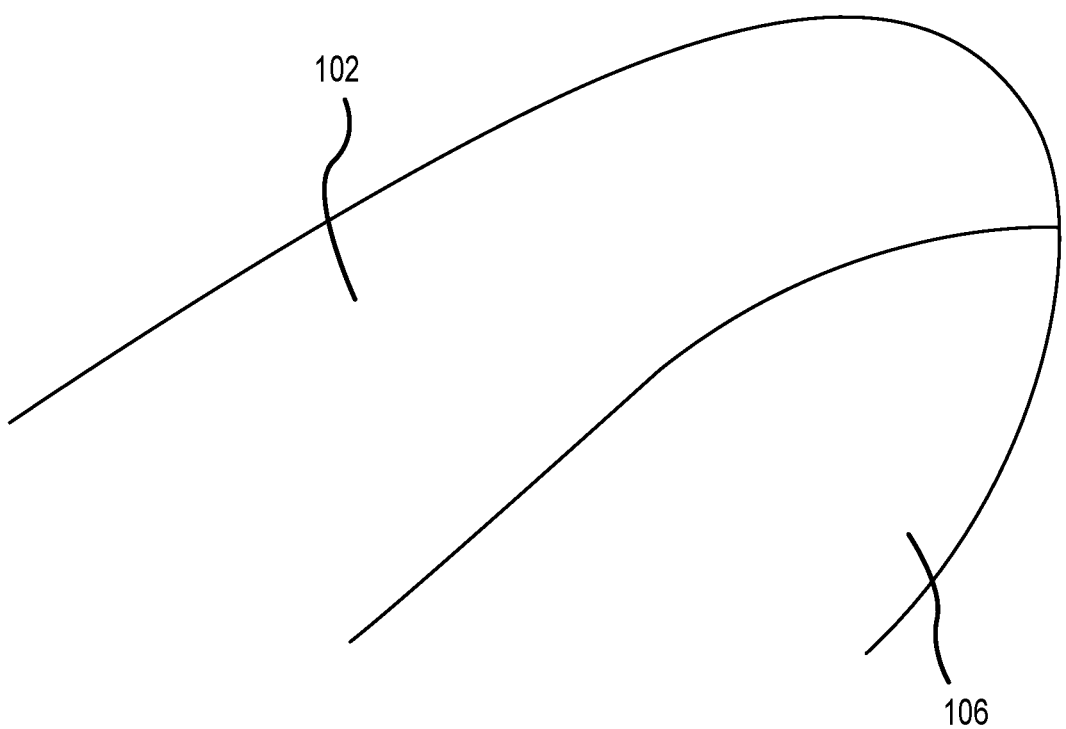
FIG. 7 is a close-up cross-sectional view of an edge of the contact lens illustrated in FIG. 5 in accordance with the present disclosure.

Alternatively, with reference to FIGS. 5-7, the gap depth varies from about 0.20 mm to about 0.40 mm in a function of $sine^2$ about the circumference of the contact lens 100. The gap 112 may open to the central area in four quadrants (e.g., 0°, 90°, 180° and 270°).

In various configurations, varying numbers of adhesives points may be used to adhere the posterior component 102 and anterior component 106. For example, in the presently described embodiment of FIGS. 5-7, four adhesive points may be used, though depending on the application, greater or fewer adhesive points may be employed. The location of the adhesive points may vary across the contact lens 100 depending on the needs of the particular application.

In various embodiments, a contact lens may comprise support structures between the anterior surface of the posterior component 102 and the posterior surface of the anterior component 106 to mitigate or prevent deformation of the space within the contact lens which can provide adaptability of the optical device to external pressure changes. For example, a contact lens may include a support structure between posterior component 102 and anterior component 106 in space 110. The support structure may comprise any suitable material and may be a separate component of the same or different material as the posterior component 102 and/or anterior component 106, generally having a height corresponding to the distance between anterior and posterior surfaces defining the depth of space 110. The support structures also have areas smaller than the diameter of space 110. In various embodiments, a support structure can be an independent component or a support structure can comprise or be integral to another component of a device such as anterior component 106 or posterior component 102.

Support structures can comprise any suitable material, such as an optical material or other structural material. Support structure can be configured to fit within space 110 and to have a diameter and/or thickness suitable to minimize interference with the optical performance of the device or appearance as a visible artifact to a wearer. Support structure may also comprise configurations and materials that enable substantially unobstructed gas exchange within the space but do not compromise the ability of the ring to provide supplemental structural support for a uniform height of space 110 in a contact lens. For example, support structures may be ring, rod or post shaped. Support structures may be bonded to either anterior component 106 or posterior component 102, or both, or may be formed as an integral portion of one or the other.

Finally, it will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

Likewise, numerous characteristics and advantages have been set forth in the preceding description, including various alternatives together with details of the structure and function of the devices and/or methods. The disclosure is intended as illustrative only and as such is not intended to be exhaustive. It will be evident to those skilled in the art that various modifications may be made, especially in matters of structure, materials, elements, components, shape, size and arrangement of parts including combinations within the principles of the invention, to the full extent indicated by the broad, general meaning of the terms in which the appended claims are expressed. To the extent that these various modifications do not depart from the spirit and scope of the appended claims, they are intended to be encompassed therein.

We claim:

1. A contact lens comprising:
   an anterior component and a posterior component with a space therebetween, the space having at least one peripheral gap, wherein the at least one peripheral gap has a depth greater than the depth of a central region of the space, and wherein the depth of the at least one peripheral gap varies as a function of sine^2 around a circumference of the contact lens;
   wherein the anterior component and the posterior component comprise gas permeable optical materials; and
   an adhesive joining the anterior component and the posterior component.

2. The contact lens of claim 1, the adhesive is located proximate an edge of the contact lens.

3. The contact lens of claim 1, wherein the adhesive is applied at points about the contact lens.

4. The contact lens of claim 1, wherein the peripheral gap has a depth of about 0.10 mm to about 0.40 mm.

5. The contact lens of claim 4, wherein the peripheral gap has a depth of about 0.20 mm to about 0.40 mm.

6. The contact lens of claim 4, wherein the peripheral gap is open to the central region in one quadrant.

7. The contact lens of claim 4, wherein the peripheral gap is open to the central region in all quadrants of the contact lens.

8. The contact lens of claim 1, wherein the depth of the peripheral gap varies from about 0.10 mm to about 0.40 mm in incremental steps.

9. The contact lens of claim 1, wherein the peripheral gap closes at 0°, 90°, 180° and 270° while remaining open to the central region between 0°, 90°, 180° and 270°, and varies as a function of sine^2 around a circumference of the contact lens.

10. The contact lens of claim 1, wherein at least one of the anterior component and the posterior component further comprise a gas impermeable optical material.

11. The contact lens of claim 1, further comprising support structures between an anterior surface of the posterior component and a posterior surface of the anterior component.

12. The contact lens of claim 11, wherein the support structures have a height corresponding to the depth of the peripheral gap at a location of the support structures.

13. The contact lens of claim 11, wherein the support structures comprise an optical material that is the same as at least one of the posterior component and the anterior component.

14. A contact lens comprising:
   an anterior component and a posterior component with a space therebetween, the space having at least one peripheral gap, wherein the at least one peripheral gap has a depth greater than the depth of a central region of the space, and wherein the depth of the at least one peripheral gap varies as a function of sine^2 around a circumference of the contact lens;
   wherein the anterior component and the posterior component comprise gas permeable optical materials; and
   an interference fit mechanism comprising a protrusion and a depression corresponding to the protrusion in the anterior component and the posterior component.

15. The contact lens of claim 14, wherein the interference fit mechanism is located proximate at least one of a landing zone of the contact lens and an edge of the contact lens.

16. The contact lens of claim 14, wherein the peripheral gap has a depth of about 0.10 mm to about 0.40 mm.

17. The contact lens of claim 16, wherein the peripheral gap has a depth of about 0.20 mm to about 0.40 mm.

18. The contact lens of claim 16, wherein the peripheral gap is open to the central region in one quadrant.

19. The contact lens of claim 16, wherein the peripheral gap is open to the central region in all quadrants of the contact lens.

20. The contact lens of claim 14, wherein the depth of the peripheral gap varies from about 0.10 mm to about 0.40 mm in incremental steps.

21. The contact lens of claim 14, wherein the peripheral gap closes at 0°, 90°, 180° and 270° while remaining open to the central region between 0°, 90°, 180° and 270°, and varies as a function of sine^2 around a circumference of the contact lens.

22. The contact lens of claim 14, wherein at least one of the anterior component and the posterior component further comprise a gas impermeable optical material.

23. The contact lens of claim 14, further comprising support structures between an anterior surface of the posterior component and a posterior surface of the anterior component.

24. The contact lens of claim 23, wherein the support structures have a height corresponding to the depth of the peripheral gap at a location of the support structures.

25. The contact lens of claim 23, wherein the support structures comprise an optical material that is the same as at least one of the posterior component and the anterior component.

* * * * *